United States Patent
Brosius

(10) Patent No.: US 11,884,886 B2
(45) Date of Patent: Jan. 30, 2024

(54) LOW PRESSURE HYDROCRACKING PROCESS FOR THE PRODUCTION OF A HIGH YIELD OF MIDDLE DISTILLATES FROM A HIGH BOILING HYDROCARBON FEEDSTOCK

(71) Applicant: University of Cape Town, Cape Town (ZA)

(72) Inventor: Roald Brosius, Wynberg (ZA)

(73) Assignee: University of Cape Town, Cape Town (ZA)

(*) Notice: Subject to any disclaimer, the term of this patent is extended or adjusted under 35 U.S.C. 154(b) by 0 days.

(21) Appl. No.: 17/261,708

(22) PCT Filed: Jul. 19, 2019

(86) PCT No.: PCT/IB2019/056191
§ 371 (c)(1),
(2) Date: Jan. 20, 2021

(87) PCT Pub. No.: WO2020/016845
PCT Pub. Date: Jan. 23, 2020

(65) Prior Publication Data
US 2021/0348070 A1    Nov. 11, 2021

(30) Foreign Application Priority Data
Jul. 20, 2018    (GB) .................................... 1811914

(51) Int. Cl.
C10G 47/18    (2006.01)
B01J 29/44    (2006.01)
B01J 29/74    (2006.01)

(52) U.S. Cl.
CPC ............. *C10G 47/18* (2013.01); *B01J 29/44* (2013.01); *B01J 29/74* (2013.01);
(Continued)

(58) Field of Classification Search
CPC ............ C10G 47/18; C10G 2300/1022; C10G 2300/4006; C10G 2300/4012;
(Continued)

(56) References Cited

U.S. PATENT DOCUMENTS 3,159,568 A    12/1964  Price et al.
3,700,585 A    10/1972  Garwood et al.
(Continued)

FOREIGN PATENT DOCUMENTS

CA    2353444    *    7/2000
FR    2367816 A1    5/1978

OTHER PUBLICATIONS

Corinne Dreannan, Aviation Biofuels: Enhancing Technical & Economic Competitiveness. (Year: 2016).*
(Continued)

*Primary Examiner* — Randy Boyer
*Assistant Examiner* — Juan C Valencia
(74) *Attorney, Agent, or Firm* — Goodwin Procter LLP

(57) ABSTRACT

The present invention provides for a low pressure, low temperature process for the production of middle distillate products, including aviation fuel and diesel, from the hydrocracking of a hydrocarbon feedstock consisting of a mixture of hydrocarbons, wherein a significant fraction of said mixture is C25+ hydrocarbons including hydrocarbons selected from Fischer-Tropsch wax, long chain paraffin and/or olefin, wherein the feedstock may include a water component.

12 Claims, 4 Drawing Sheets

(52) U.S. Cl.
CPC ............... *C10G 2300/1022* (2013.01); *C10G 2300/4006* (2013.01); *C10G 2300/4012* (2013.01); *C10G 2300/4018* (2013.01); *C10G 2300/70* (2013.01)

(58) Field of Classification Search
CPC ......... C10G 2300/4018; C10G 2300/70; B01J 29/44; B01J 29/74
See application file for complete search history.

(56) References Cited

U.S. PATENT DOCUMENTS

| | | | |
|---|---|---|---|
| 3,755,145 | A | 8/1973 | Orkin |
| 3,867,277 | A | 2/1975 | Ward |
| 3,932,640 | A | 1/1976 | Holland |
| 4,263,129 | A | 4/1981 | Chen et al. |
| 4,396,538 | A | 8/1983 | Chen et al. |
| 4,683,050 | A | 7/1987 | Ward |
| 4,829,040 | A | 5/1989 | Ward |
| 5,290,744 | A | 3/1994 | Degnan Jr. et al. |
| 5,565,088 | A | 10/1996 | Nair et al. |
| 6,294,077 | B1 | 9/2001 | Dougherty et al. |
| 6,337,010 | B1 | 1/2002 | Hofer |
| 6,858,127 | B2 | 2/2005 | Hoek et al. |
| 9,051,520 | B2 | 6/2015 | Batalha et al. |
| 2001/0001449 | A1* | 5/2001 | Kiliany .............. C10G 47/20 208/111.15 |
| 2004/0256287 | A1 | 12/2004 | Miller et al. |
| 2009/0065394 | A1* | 3/2009 | Petri .................. C10G 47/20 422/223 |
| 2013/0001128 | A1 | 1/2013 | Kibby et al. |

OTHER PUBLICATIONS

Wiley, Phytoremediation, Methods and Reviews, Methods in Biotechnology, Humana Press, 2007 (Year: 2007).*
International Search Report and Written Opinion issued for PCT/IB2019/056191, dated Dec. 4, 2019 (10 pages).
Link, et al. "Low Pressure Hydrocracking of Wax over Pt/SiO2—Al2O3 to Produce Kerosene for Synthethic Jet Fuel", ACS Symposium Series; American Chemical Societ: Washington DC 2021.
Leckel, et. al. "Diesel-Selective Hydrocracking of an Iron-Based Fischer-Tropsch Wax Fraction (C15-C45) Using a MoO3-Modified Noble Metal Catalyst", Energy & Fuels, 2006, 20, pp. 2330-2336.
Leckel "Low-Pressure Hydrocracking of Coal-Derived Fischer-Tropsch Waxes to Diesel", Energy & Fuels 2007, 21, pp. 1425-1431.
C. Bouchy et al., "Fischer-Tropsch Waxes Upgrading via Hydrocracking and Selective Hydroisomerization", Oil Gas Sci. Technol., 2009, 64(1):91-112.
C. T. O'Connor et al., "Cetane number determination of synthetic diesel fuels", Fuel, 1992, vol. 71, pp. 1323-1327.
D, Leckel and M. Liwanga-Ehumu, "Diesel-Selective Hydrocracking of an Iron-based Fischer-Tropsch Wax Fraction ($C_{15}$-$C_{45}$) using a $MoO_3$ Modified Noble Metal Catalyst", 2006, vol. 20, pp. 2330-2336.
D. Leckel, "Diesel Procuction from Fischer-Tropsch: The Past, the Present, and the New Concepts", Energy Fuels, 2009, vol. 23, pp. 2342-2358.
D. Leckel, "Low-Pressure Hydrocracking of Coal-Derived Fischer-Tropsch Waxes to Diesel", ENergy Fuels, 2007, vol. 21, pp. 1425-1431.
H. Kumar and G. Froment, "A Generalized Mechanistic Kinect Model for the Hydroisomerization and Hydrockracking of Long-Chain Paraffins", 2007, vol. 46, pp. 4075-4090.
M.A. Baltanash, et al., "Hydroisomerization and Hydrocracking. 5. Kinetic Analysis of Rate Data for n-Octane", Ind. Eng. Chem. Prod. Res. Dev., 1983, vol. 22, pp. 531-539.
P. Dufrense, et al., "New developments in hydrocracking: low pressure high-convesion hydrockracking", Catal. Today, 1987, vol. 1, pp. 367-384.
S. Gamba et al., "Liquids fuels from Fishcer-Triosch wax hydrocracking: Isomer distribution", Catalysis Today, 2010, vol. 156, pp. 58-64.
W. Ma, et al., "Hydrocracking of Octacosane and Colbalt Fischer-Tropsch Was over Nonsulfided NiMo and Pt-Based Catalyst", Reactions, 2021, vol. 2, pp. 374-390.
Yan Peng-hui, et al., "Effect of impreggation methods on nickel-tungsten catalysts and its performance on hydrocracking fischer-tropsch wax", Journal of Fuel Chemistry and Technology, 2013, 41(6):691-697.
Kang et al., "Hydrocracking and Hydroisomerization of n-Hexadecane, n-Octacosane and Fischer-Tropsch Wax Over a Pt/$Sio_2$-$Al_2O_3$ Catalyst", Catal Lett., 2012, vol. 142, pp. 1295-1305.

* cited by examiner

LOW PRESSURE HYDROCRACKING PROCESS FOR THE PRODUCTION OF A HIGH YIELD OF MIDDLE DISTILLATES FROM A HIGH BOILING HYDROCARBON FEEDSTOCK

INTRODUCTION

This invention relates to a low pressure, low temperature process for the production of middle distillate products, including aviation fuel and diesel, from the hydrocracking of a hydrocarbon feedstock. In particular, but not exclusively, the invention relates to the low pressure hydrocracking of a hydrocarbon feedstock comprising a significant fraction of C25+ hydrocarbons, including Fischer-Tropsch wax, long chain paraffin and long chain olefin, wherein the feedstock may include a water component.

BACKGROUND

Pressure, be it total pressure or hydrogen partial pressure, is the biggest cost in the hydrocracking unit of a modern refinery, both the recurring expense to provide for compression of fresh and recycled hydrogen as well as the enormous capital expenditure to build a hydrocracking plant. The latter is the reason why roughly 40% of the world's refineries do not possess and hesitate to invest in hydrocracking technology, especially as the tide is turning against carbon dioxide emitting energy carriers.

Nevertheless, the demand for crude oil derived fossil fuels grows, and at least for aviation fuel there appears to be no alternative in the foreseeable future. Hydrocracking (HC) remains the only refinery process that can produce predominantly middle distillates such as diesel and aviation fuel, from crude oil but also from Fischer-Tropsch (FT) waxes, the latter of which may be derived from alternative sources such as natural gas or sustainable renewables.

While conventional hydrocracking aimed at total conversion operates at hydrogen pressures of more than 100 bar, mild hydrocracking, which is an evolution of the hydrodesulphurization (HDS) process, operates at relatively low conversions at hydrogen pressures of about 30 to 70 bar. It is thus obvious that hydrogen pressure is a key parameter for hydrocracking performance (P. Dufresne, P. H. Bigeard, A. Billon, Catal. Today 1987, 1, 367-384). Thermodynamically, hydrogenation of aromatics is favoured by high pressure, low temperature and low molecular weight. On the other hand, when the thermodynamic conditions are satisfied, heavy aromatics react faster than light ones over Group VI metal sulphides whereas the opposite is true for Group VIII metals. Kinetically, the rate of hydrogenation—hydrodearomatization (HDA), hydrodenitrogenation (HDN) and HDS—increases proportionally with pressure. The rates of isomerization and cracking are subject to two competing effects. On the one hand, the rates have been observed to decrease with increasing pressure (M. A. Baltanas, H. Vansina, G. F. Froment, Ind. Eng. Chem. Prod. Res. Dev., 1983, 22, 531). On the other hand, a positive influence of an increase of hydrogen pressure on the rate is attributed to hydrogen cleaning the surface by hydrogenating coke precursors.

Hydrocracking catalysts are bifunctional catalysts consisting of a (de)-hydrogenating function and an acid function. Group VI and VIII metal sulphides (NiW, NiMo, CoMo) generally require average bed temperatures in excess of 340° C. to hydrogenate the complex S and N molecules and the multi-ring aromatics in crude oil derived feed fractions. The balance of (de)-hydrogenation and acid functions affects the ideality of the catalyst in such a way that when the metal is not rate limiting over-cracking of the olefin reaction intermediates can be minimized. The literature record shows that amorphous silica-alumina (ASA) solid acids have been preferred because their weak or medium acid strength avoids over-cracking and gives rise to high middle distillates yields (C. Bouchy, G. Hastoy, E. Guillon, J. A. Martens, Oil Gas Sci. Technol. 2009, 64, 91-112).

Considerable efforts were undertaken to discover acid supports for the hydrocracking catalyst that do not deactivate due to coking at the lower pressures of the HDS reactions, for a better integration of HDS and HC in mild hydrocracking to lower the cost of the process. U.S. Pat. Nos. 4,683,050 and 4,829,040 disclose that intermediate pore non-zeolitic molecular sieves such as SAPO-41 and SAPO-11 were found suitable acid functions for mild hydrocracking catalysts. U.S. Pat. Nos. 3,159,568, 3,867,277 and 3,932,640 disclose that ultra-stable Y zeolite containing catalysts are also suitable for mild hydrocracking. U.S. Pat. No. 5,290,744 demonstrates how hydrotreating and hydrocracking can also be united in one composite catalyst formulation, composed of a large mesoporous hydrotreating catalyst (NiW/MCM-41) and a hydrocracking component such as USY or even ZSM-5, in case hydrocracking products with low pour points are desired.

FT-wax is generally fully saturated and consists mainly of linear alkanes and a small fraction of branched alkanes, but contains neither naphthenes or aromatics nor any S or N. This permits the use of lower pressures, generally in the range of 35-70 bar (D. Leckel, Energy Fuels 2009, 23, 32-37 and D. Leckel, Energy Fuels 2009, 23, 2342-2358). A small fraction of oxygenates in the feed affects the balance of metal and acid sites of the catalyst with alcohols inhibiting acid sites and acids inhibiting metal sites, thereby respectively increasing and decreasing the diesel selectivity (D. Leckel, Energy Fuels 2007, 21, 662-667).

In 1972, in U.S. Pat. No. 3,700,585, N.Y. Chen et al. disclosed that straight-chain hydrocarbons and slightly branched-chain hydrocarbons can be selectively cracked from a hydrocarbon stream utilizing the unique molecular sieving properties of crystalline alumino-silicate microporous zeolites having MFI framework topology. The catalyst contained acid protons to balance the negative zeolite framework charge as well as a metal component able to catalyze (de)hydrogenation reactions. The process of the invention proved particularly useful for the dewaxing of hydrocarbon oils including removal of high freezing point paraffins from aviation fuel, as well as improving the octane rating of naphtha fractions.

The abovementioned patent also reveals to anyone skilled in the art of hydrocracking that besides the desired lube base oil or fuel products with dramatically reduced pour points, mostly light gas and a little bit of naphtha are formed from the selective removal of undesired linear and lightly branched paraffins. The intermediate pore of the ZSM-5 zeolite imparts not only shape-selectivity but also very high reactivity to mono-branched and linear paraffins, resulting in their cracking products being cracked consecutively. U.S. Pat. No. 3,755,145 and FR. Pat. No. 2,367,816 show that by combining a ZSM-5 zeolite with an amorphous hydrocracking catalyst component that can convert large bulky molecules, both the viscosity index and the pour points of lubricants can be improved.

Since the original disclosure of a dewaxing process, the benefits of iso-dewaxing over dewaxing have been discovered with the advent of new intermediate pore zeolites with different pore mouths than ZSM-5. U.S. Pat. No. 6,337,010 discloses an isomerization-type dewaxing operation in which the cracking of the paraffin component of the hydrocarbon is minimized. An increased iso-/n-ratio in the middle distillate products with decreasing pressure between 60 and 35 bar has been documented (S. Gamba, L. A. Pellegrini, V. Calemma, C. Gambaro, Catal. Today 2010, 156, 58-64).

When the conversion of hydrocarbons by hydrocracking is conducted over low acidity zeolites such as the sodium form of zeolite ZSM-5, substantially less C1-C4 is produced (U.S. Pat. No. 4,263,129). Sulphiding of sodium zeolites seems to activate them for the purpose of hydrocracking. A comparative example in U.S. Pat. No. 4,396,538 demonstrates clearly how Na/ZSM-5 although significantly less active than H/ZSM-5 yields much more middle distillates and consequently much less light gas. A controlled acidity reduction of the ZSM-5 zeolite has also proven beneficial for dewaxing of lubricating oil stocks in U.S. Pat. No. 6,294,077.

It is the object of this invention to provide a novel process, not for the selective removal of linear or slightly branched paraffins from distillate fractions by hydro-dewaxing, but rather for the hydrocracking of a heavy hydrocarbon feed fraction boiling above the range of middle distillates to selectively produce middle distillate fractions.

Efforts to operate a hydrocracking catalyst at even lower pressures than applied in mild hydrocracking have not been met with success. In fact, the prior art (Leckel et al.) teaches that efforts to produce diesel from wax at low pressure has been wholly unsuccessful because the catalyst deactivates. Furthermore, it teaches that more diesel is formed at higher pressure (D. Leckel, M. Liwanga-Ehumbu, Energy Fuels 2006, 20, 2330-2336; D. Leckel, Energy Fuels 2007, 21, 1425-1431).

Others skilled in the art agree that with lower pressure less diesel is produced, and that therefore there is no reason to even try operate a hydrocracking process at very low pressures (J. Kang, W. Ma, R. A. Keogh, W. D. Shafer, G. Jacobs, B. H. Davis, Catal. Lett. 2012, 142, 1295-1305).

In addition, a comprehensive micro-kinetic model for hydrocracking of n-C32 paraffin over well balanced (ideal) as well as hydrogenation deficient (non-ideal) catalysts explains that increasing the pressure brings non-ideal catalysts closer to ideality, thereby increasing the diesel yield (H. Kumar, G. F. Froment, Ind. Eng. Chem. Res. 2007, 46, 4075-4090).

The stronger acidity of zeolites compared to amorphous silica-alumina supports is a consequence of the stronger adsorption of the transition states of the cracking reaction in the confinement of the micropores. While confinement and stabilization of reaction intermediates in the micropores results in higher reaction rates, secondary cracking reactions may occur and desorption becomes the rate limiting step.

Enhancing diesel yield remains a challenging goal in hydrocracking catalysis. Additionally, alkanes increase the diesel fuel cetane number and, consequently, effect a dramatic reduction in exhaust emissions.

Therefore, there remains a need in the field of hydrocracking for a process that produces high yields of high-quality middle distillates from hydrocarbon feedstocks, including FT-wax, at low pressure, particularly at pressures approaching atmospheric pressure. The present invention has the potential to dramatically lower the cost of new hydrocracking units, including two stage hydrocracking units in which the second stage is a sweet loop, that is, the near absence of ammonia and hydrogen sulphide, operated at atmospheric pressure with a noble metal loaded zeolite catalyst.

SUMMARY OF THE INVENTION

According to a first aspect to the present invention there is provided a process for the production of a middle distillate from a hydrocarbon feedstock, wherein a significant fraction of the feedstock is C25+ hydrocarbons, the method comprising feeding the hydrocarbon feedstock into a hydrocracking reactor and over a noble metal loaded zeolite catalyst contained in the reactor, wherein the zeolite is selected from an intermediate pore zeolite, a large pore zeolite, and combinations thereof, characterized in that the process is performed at a temperature of about 260° C. or less, and a pressure of less than about 10 bar.

In a preferred embodiment, the process is performed at a pressure of less than about 5 bar to about atmospheric pressure.

In a particularly preferred embodiment, the process is performed at about atmospheric pressure.

In one embodiment, the process is performed at a temperature of about 160° C. to about 260° C.

Preferably, the liquid hourly space velocity of the process is between about 0.05 h$^{-1}$ to about 5.0 h$^{-1}$.

More preferably, the liquid hourly space velocity of the process is between about 0.1 h$^{-1}$ to about 1.0 h$^{-1}$.

Preferably, the H$_2$/hydrocarbon volumetric feed ratio is between about 1,000 vol./vol. to about 10,000 vol./vol.

In one embodiment, zeolite is an intermediate pore zeolite having a MFI or MEL framework topology, for example ZSM-5 having MFI topology.

In a preferred embodiment, the zeolite is a large pore zeolite having a FAU or BEA framework topology.

Preferably, the noble metal is platinum or palladium.

Preferably, a significant fraction of the feedstock is C25-C100 hydrocarbons.

Preferably, the process provides a middle distillate yield of greater than about 60% at atmospheric pressure, wherein the middle distillate is a C10-C24 fraction.

In one embodiment, the hydrocarbon feedstock comprises a water component.

In one embodiment, the hydrocarbon feedstock is a product of the Fischer-Tropsch process.

According to a second aspect to the present invention there is provided a C10-C24 middle distillate produced according to the process of the invention.

Preferably, the C10-C24 middle distillate comprises more than 90% branched alkanes.

BRIEF DESCRIPTION OF THE DRAWINGS

The invention will now be described in more detail with reference to the following non-limiting embodiments and figures in which.

DETAILED DESCRIPTION OF PREFERRED EMBODIMENTS

Figure 1:
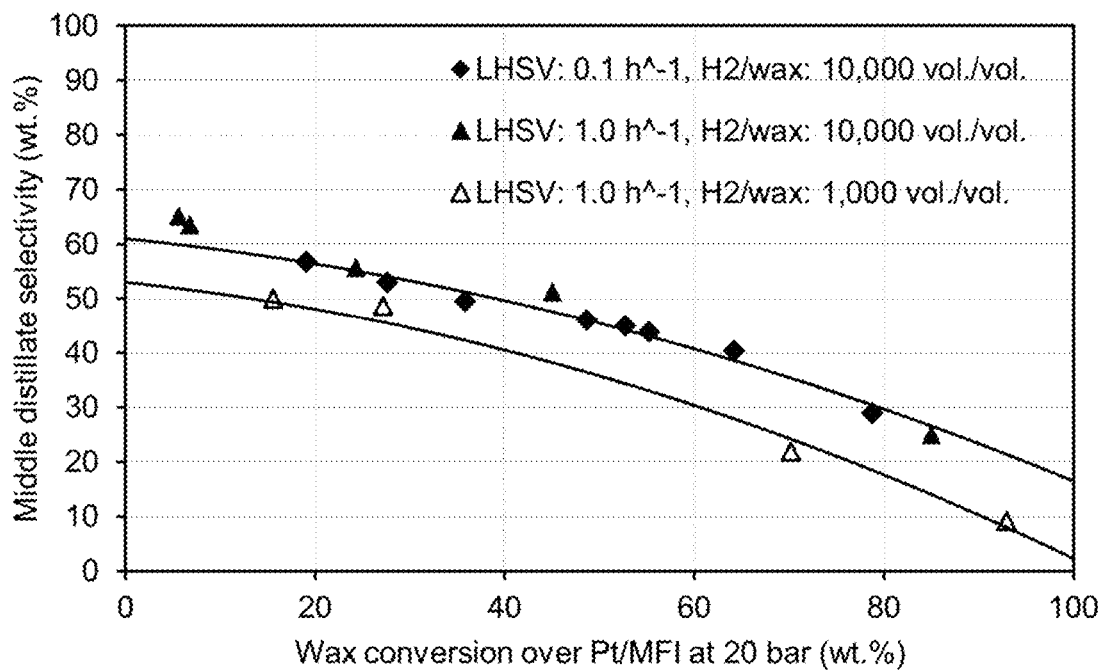
FIG. 1 shows the effect of hydrogen gas flow rate (H$_2$/wax: 1,000-10,000) on middle distillate formation from wax hydrocracking over Pt/MFI at 20 bar, as well as the effect of a lower space velocity (LHSV: 1.0-0.1 h$^{-1}$)

The present invention will now be described more fully hereinafter with reference to the accompanying figures, in which some of the non-limiting embodiments of the invention are shown.

The invention as described hereinafter should not be construed to be limited to the specific embodiments disclosed, with slight modifications and other embodiments intended to be included within the scope of the invention.

Although specific terms are employed herein, they are used in a generic and descriptive sense only and not for purposes of limitation.

As used herein, throughout this specification and in the claims which follow, the singular forms "a", "an" and "the" include the plural form, unless the context clearly indicates otherwise.

The terminology and phraseology used herein is for the purpose of description and should not be regarded as limiting. The use of the terms "comprising", "containing", "having", "including", and variations thereof used herein, are meant to encompass the items listed thereafter, and equivalents thereof as well as additional items.

The present invention provides for a low pressure, low temperature process for the production of middle distillate products, including aviation fuel and diesel, from the hydrocracking of a hydrocarbon feedstock.

In particular, but not exclusively, the invention relates to the low pressure hydrocracking of a hydrocarbon feedstock consisting of a mixture of hydrocarbons, wherein a significant fraction of said mixture is C25+ hydrocarbons including hydrocarbons selected from Fischer-Tropsch wax, long chain paraffin and/or olefin, wherein the feedstock may include a water component.

A signification fraction may be fraction containing more than about 20%, more than about 25%, more than about 30%, more than about 35%, more than about 40%, more than about 45%, more than about 50%, or more than about 55% C25+ hydrocarbons. The hydrocarbon feedstock may, for example, be a mixture of hydrocarbons in which a significant fraction thereof is C25-C100 hydrocarbons. For example, the hydrocarbon feedstock may be a mixture comprising about 20% to about 80% C12-C24 hydrocarbons and about 80-about 20% C25-C100 hydrocarbons.

The terms "middle distillate", "middle distillate fraction", or variations thereof, where used throughout this specification, refer to mixtures of hydrocarbons comprising substantially C10-C24 hydrocarbons, including diesel.

The terms "Fischer-Tropsch wax" or "wax", where used throughout this specification, refer to mixtures of hydrocarbons comprising substantially linear paraffin of which a significant fraction has a boiling point higher than that of middle distillate.

The term "long chain paraffin", where used throughout this specification, refers to a mixture of alkanes in which a significant fraction has a chain length of at least 16 carbon atoms, or wherein a significant fraction of said mixture comprises alkanes with a chain length of at least 24 carbon atoms.

The term "long chain olefin", where used throughout this specification, refers to a mixture of alkenes in which a significant fraction has a chain length of at least 16 carbon atoms, or wherein a significant fraction of said mixture comprises alkenes with a chain length of at least 24 carbon atoms.

The inventor has surprisingly found that lowering or releasing the overall pressure of the hydrocracking process to below 20 bar, preferably to below about 10 bar, more preferably to below about 5 bar and most preferably to about atmospheric pressure, achieves dramatically increased middle distillate yields from Fischer-Tropsch (FT) wax, both in intermediate pore (MFI) zeolite as well as in large pore (FAU) zeolite.

Furthermore, in MFI zeolite the reversible deactivation of the acid zeolite catalyst by FT product water that was previously observed with co-feeding of n-hexadecane and water and with wax hydrocracking at typical reactions conditions of 20 bar, is much lower at 10 bar and entirely disappears at atmospheric pressure. Both the activity and the selectivity of the MFI zeolite catalyst are higher at atmospheric pressure regardless of whether water is present. With a large pore zeolite such as FAU, it was found that much higher yields can be achieved at atmospheric pressure than under hitherto applied typical industrial reaction conditions. A maximum single pass yield of 70% is demonstrated and the product consist of 96% branched paraffin imparting on the middle distillate product a very low pour point. Contrary to what has been reported for amorphous silica-alumina support based hydrocracking catalysts, according to the present invention there is no apparent deactivation of the catalyst at atmospheric pressure.

In one embodiment, the invention provides for the production of a middle distillate from a hydrocarbon feedstock, the method comprising feeding the hydrocarbon feedstock into a hydrocracking reactor and over a noble metal loaded zeolite catalyst contained in the reactor, wherein the zeolite is selected from an intermediate pore zeolite, a large pore zeolite, and combinations thereof, characterized in that the process is performed at atmospheric pressure, and at a temperature of 260° C. or less. The hydrocarbon feedstock comprises substantially C25+ hydrocarbons and can be a product of the Fischer-Tropsch process. The middle distillate is defined as the C10-C24 fraction, naphtha as the C5-C9 fraction and light gas as the C1-C4 fraction of the product. The noble metal can be either platinum or palladium.

In a further embodiment, the zeolite is a large pore zeolite FAU, loaded with 1 wt. % platinum, the H$_2$/hydrocarbon volumetric feed ratio is between 1,000 vol./vol. and 10,000 vol./vol., the liquid hourly space velocity of the process is not critical and can be between 0.1 h$^{-1}$ to 5.0 h$^{-1}$. In this preferred embodiment, the process provides a middle distillate yield of greater than 60% by weight at atmospheric pressure, wherein the middle distillate is a C10-C24 fraction.

In another embodiment, the zeolite is a large pore zeolite FAU, loaded with 1 wt. % platinum, the $H_2$/hydrocarbon volumetric feed ratio is between 1,000 vol./vol. and 10,000 vol./vol. and the liquid hourly space velocity of the process is 0.1 $h^{-1}$. A middle distillate yield of 70% by weight at atmospheric pressure is provided with the middle distillate consisting of more than 95% branched paraffin and less than 5% linear paraffin having a cloud point that is lower than −40° C.

In another embodiment, the zeolite is an intermediate pore zeolite having a MFI framework type, the $H_2$/hydrocarbon volumetric feed ratio is between 1,000 vol./vol. and 10,000 vol./vol., the liquid hourly space velocity of the process is between 0.05 $h^{-1}$ to 0.2 $h^{-1}$ and the process provides a middle distillate yield of 60% by weight at atmospheric pressure.

In yet another embodiment, the hydrocarbon feedstock comprises a water component, the zeolite is an intermediate pore zeolite having a MFI framework type, the $H_2$/hydrocarbon volumetric feed ratio is between 1,000 vol./vol. and 10,000 vol./vol., the liquid hourly space velocity of the process is between 0.05 $h^{-1}$ to 0.2 $h^{-1}$, the $H_2O$/hydrocarbon volumetric feed ratio is 1.0 vol./vol. and the process provides a middle distillate yield of 60% by weight at atmospheric pressure.

Catalyst Preparation and Activation

The zeolite support size and shape may be any of those that are typically used in industrial scale hydrocracking. These are normally cylindrical, three-lobe, quadru-lobe or ball shapes with size ranging from 1/10" (2.54×10$^{-3}$ m) to 1/20" (1.27×10$^{-3}$ m). The zeolite is typically mixed with a small amount of alumina binder and a peptizing agent in order to produce an extrudate with the desired abrasion resistance. In the laboratory size experiments of the present invention, mechanical abrasion is not a concern and extrudates or pellets from compressed powder can be interchanged. The size of the pellets or extrudates is in the same order as those used in industrial scale reactors. In one example, H-MFI-90 zeolite powder (Clariant, formerly Süd-chemie, commercial sample) was extruded into cylindrical pellets measuring 1.25 by 3-4 mm. In another example, HY zeolite (CBV760, Zeolyst commercial sample) powder was pelletized in a hydraulic press at 5 tons to approximately 1 g of zeolite powder, spread out over about 20 cm$^2$, the wafer was then crushed and sieved to retain the 0.85-1.25 mm fraction.

The preferred $SiO_2/Al_2O_3$ ratio for zeolites with MFI topology for the process according to the invention is from about 1 to about 1000, preferably from about 5 to about 500, more preferably from about 10 to about 200, and most preferably between about 80 and about 100.

The preferred $SiO_2/Al_2O_3$ ratio for zeolites with FAU topology for the process according to the invention is from about 2 to about 200, preferably from about 5 to about 100, more preferably from about 20 to about 80, and most preferably about 60.

The noble metal to be added to the zeolite material may be any noble metal selected from the noble metal group of metals. Preferably the noble metal is a metal selected from the platinum group metals including platinum, palladium, ruthenium, rhodium, osmium, and iridium. Most preferably the noble metal is selected from the group consisting of platinum and palladium. The noble metal may be added to the zeolite material, for example, by an incipient wetness technique, at a final concentration of about 0.1 wt. % to about 5 wt. %, preferably about 0.2 wt. % to about 2 wt. %, preferably about 0.5 wt. % to about 1.5 wt. %, most preferably about 1 wt. %. Although the noble metal may preferably be added to the zeolite material by an incipient wetness technique, it is envisaged that any other known method to deposit noble metals onto a zeolite support may be used, including but not restricted to ion-exchange, chemical vapour deposition, competitive ion-exchange, solid state ion-exchange, or any other method known in the art. The noble metal, such as platinum or palladium, may be used in any oxidation state and in any coordination with any ligands and salt building counter-ions known in the art of inorganic chemistry.

In one example, platinum noble metal was added by an incipient wetness impregnation method. 21 g of zeolite MFI extrudates was mixed with 15.05 ml of a 2.79 wt. % $Pt(NH_3)_4(NO_3)_2$ solution. This resulted in a Pt/MFI catalyst with 2 wt. % Pt. In another example, 21 g of zeolite HY powder was mixed with 6.77 ml of a 2.79 wt. % $Pt(NH_3)_4(NO_3)_2$ solution diluted with water to 24.8 ml total solution. This resulted in a Pt/HY catalyst with 1 wt. % Pt.

Prior to the addition of the platinum, the zeolite catalyst pellets were calcined under static ambient air from room temperature to 550° C. in 8 hours, where it remained for 8 hours before it was allowed to cool down to room temperature. The Pt solution was sprayed onto the zeolite pellets in a 250 ml Erlenmeyer flask using a plastic pipette. The pore volume of the zeolite pellets was 0.66 g $H_2O$/g zeolite. The pore volume was determined by soaking a known mass of the zeolite pellets in water, draining and filtering the excess water to determine the fully wetted weight, and subsequently drying and calcining the zeolite pellets to establish the dry weight. The Pt solution wetted zeolite pellets were tumbled repeatedly in the Erlenmeyer flask to ensure complete wetting of all the pellets and uniform drying at room temperature for at least 2-3 days prior to loading in the hydrocracking reactor.

The catalyst loaded reactor was heated at 0.3° C./min from room temperature to 350° C. under 200 ml/min of flowing pure oxygen ($O_2$) and left at 350° C. for 1 hour before being allowed to cool down again to room temperature. While cooling down, the gas flowing over the catalyst was changed to pure nitrogen ($N_2$). Subsequently, the gas flow was changed to $H_2$ and the catalyst was reduced in 200 ml/min of flowing hydrogen ($H_2$) by heating it at 0.4° C./min from room temperature to 225° C., whereupon the catalytic experiments, described in more detailed below, were performed.

Hydrocracking Reactor System

A bench-scale fixed bed dual tube with 16 mm internal diameter reactor system, operating in down-flow mode, was used for the hydrocracking experiments. The description below is valid for both of the reactor tubes that resided in the same brass reactor heating block. Prior to start-up, wax pellets were molten and poured into an insulated 500 ml heated silo or reservoir that contained 40 ml of water heated to 93° C. Water and molten wax are immiscible and wax floats on top.

Once the temperature of the molten wax was stable at 93° C., a Lab-alliance series 1 HPLC was used to pump water into the bottom of the silo in order to displace wax into the reactor. The reactor head was heated to 110° C. to prevent cold spots from arising and to ensure the continuous flow of molten wax without pressure gradients. The catalyst bed was supported by a wire metal grid in the isothermal zone of the reactor block which was 36 cm long. The temperature of the brass reactor block with square box heaters was calibrated at all temperatures used in the experiments and the isothermal zone within the brass block was 20 cm long. The reactor tubes protruded from the reactor heating block about 8 cm at the bottom and 12 cm at the top. A back-pressure regulator maintained all of the above at the desired pressure either atmospheric pressure or higher.

Procedure and Operating Conditions

The catalyst activity was monitored by drawing product samples from the hot wax trap after steady-state conditions were reached, typically after a period of 24 h subsequent to a change in reaction conditions. The following 24 h period was then used to collect a representative sample for product analysis. A complete mass balance is determined by weighing the unconverted wax, adding the condensed liquid products from the cold trap and making up the balance with the gaseous products that are sampled on the online GC. A closed mass balance is ensured with the accurate measurement of the density of molten wax, and double checked with a blank run to confirm that the volume of wax pumped equals the volume of wax recovered over a period of 14 days and on a day to day basis.

Hydrocracking was performed in the temperature range of about 180° C.-260° C. Pressure was varied between atmospheric and 20 bar. A catalyst bed of 1 g, 10 g or 20 g and a density of 0.8 g/ml was loaded in the hydrocracking reactor and exposed to a wax feed stream of 0.02 ml/min with a hydrogen flow rate of 20 ml/min or 200 ml/min. The liquid hourly space velocity (LHSV) varied between 1 and 0.1 h$^{-1}$. All experiments were performed in top-to-bottom once through down-flow mode.

While a laboratory test unit and an industrial scale unit use the same size catalyst extrudates, the mass flux and therefore the flow regime to which these are exposed is dramatically different. For the same liquid hourly space velocity, LHSV (h$^{-1}$); FN, liquid oil volumetric flow rate divided by catalyst volume, the mass flux, defined as F/A (m/hr), volumetric flow rate divided by the cross-sectional surface area, A, is roughly two orders of magnitude larger in an industrial scale unit than in a typical laboratory size unit. The mass flux, which is the superficial linear velocity over the catalyst pellets, is an important variable for the flow regime of the liquid. At low linear velocities, the flow regime is laminar and a boundary layer is established around the catalyst pellets. This boundary layer presents an impediment to diffusion of hydrogen from the gas phase to the adsorbed liquid at the catalyst surface. At high linear velocities, a turbulent flow regime is established which leads to a thinner boundary layer around the catalyst pellets. In the latter case hydrogen diffuses more easily across the liquid to the catalyst surface. In the limiting case where the catalyst surface is deprived of hydrogen at insufficient linear velocities, side reactions may occur that lead to the deactivation of the catalyst. Laboratory size experiments thus tend to overestimate the catalyst deactivation they aim to forecast in the industrial unit.

The hydrocarbon feed consists almost entirely of linear paraffin molecules boiling above 390° C. Due to the negligibly small tail of hydrocarbon feed molecules smaller than C25, a discrimination between feed and product molecules could be made without a significant error. Therefore, all molecules from C1 to C24 were considered products and everything from C25 upwards was considered feed. In the terminology frequently used by refiners, in the present invention gross conversion is the same as true conversion for lack of a fraction of the feed boiling in the product boiling point range. The hydrocarbon feed carbon number distribution displayed a bell-shape centred at about C42 and no paraffin molecules longer than C80 were detected. Table 1 below summarizes the feed properties, composition by weight and distillation by true boiling point (° C.) as calculated from the gas chromatographic analysis of the hydrocarbon feedstock used.

TABLE 1

Wax physical properties representing paraffin feedstocks
FTW.X.SA Fischer-Tropsch synthesis derived wax from Sasol

| Density | | | Distillation (TBP) | |
|---|---|---|---|---|
| ρ @ 25° C. | g/ml | 0.923 | IBP | 195.9 |
| ρ @ 93° C. | g/ml | 0.766 | 1% | 388.0 |
| Organic heteroatom impurities | | | 5% | 438.1 |
| S | wt. % | 0.0 | 10% | 468.5 |
| N | wt. ppm | 0.0 | 20% | 496.4 |
| O | wt. % | 0.1 | 30% | 511.5 |
| Paraffins | | | 40% | 523.3 |
| n-paraffin | wt. % | 94.0 | 50% | 534.1 |
| iso-paraffin | wt. % | 6.0 | 60% | 544.6 |
| Olefins | wt. % | 0.0 | 70% | 555.4 |
| Naphthenes | wt. % | 0.0 | 80% | 567.5 |
| Aromatics | | | 90% | 583.8 |
| mono- | wt. % | 0.0 | 95% | 597.0 |
| di- | wt. % | 0.0 | 99% | 624.0 |
| tri- | wt. % | 0.0 | FBP | 677.8 |

Product Analysis

The reactor tail effluent passed through a back-pressure regulator into a heated wax collection vessel with metal wire mesh internals set to 110° C., from where the molten wax could be recovered at the bottom. The C1-C4 gas, the C5-C9 naphtha, and a large part of the C10-C24 middle distillates fractions boiled over and passed through a condenser set to 2° C. before collecting in a cold trap vessel also set to 2° C., which was half filled with water.

The cold trap containing a water layer and a hydrocarbon mixture layer was drained in order to sample the middle distillate fraction. The gas and liquids passing through the cold trap bubbled through the liquid water and liquid hydrocarbons to ensure optimal heat exchange and maximal condensation. The gaseous products that don't condense were passed through a heated tube to a gas chromatograph where a gas sample was injected from the sample loop by switching a 6-port, 2-way sample valve. The products drained out of the cold trap where separated from the water by means of standard plastic pipettes. The molten wax was allowed to cool down and solidify.

A) Wax Sampling

A 0.02 g wax sample was added to a GC sample vial and diluted with and dissolved in 1 ml of carbon disulphide (CS$_2$). The GC sample vial was kept at 50° C. prior to injection into a Bruker scion 436-GC equipped with an Agilent J&W GC Columns VF-5ht Ultimetal 30 meter, 0.32 ID with a 10 µm thick stationary phase column (P/N 9096). The carbon number distributions were determined using the following GC method: initial column temperature of 50° C. and initial column holding time of 0 min; column ramp rate of 5° C./min; final column temperature of 425° C. with a final column holding time of 0 min; initial injector temperature of 50° C.; initial injector holding time of 0 min; injector ramp rate of 25° C./min; final injector temperature of 400° C.; final injector holding time of 61 min for a total run time of 75 min; hydrogen carrier gas; detector temperature of 375° C.; and sample volume injection of 1 µl. Baseline separation was practically achieved this way and the full carbon number distribution was quantified from C12 to C80. The branched and linear paraffins could be separated from C12 up to C53. From C30 upwards to higher carbon numbers, the branched fraction overlaps with the linear fraction of the lower carbon number giving rise to a distinct valley above the baseline or a distinct shoulder in the chromatogram. The lowest point of the valley or the inflection point in the shoulder were used to manually integrate the chromatogram.

B) Liquid Products Sampling

The carbon number distributions of the liquid products were determined on a Varian CP-3900 GC equipped with a FID detector and an Agilent J&W GC Columns CP-Sil 5 CB 25 meter, 0.15 ID with a 2 μm thick poly-dimethyl-siloxane stationary phase capillary column (P/N 7692). The following GC method was applied: initial column temperature of 40° C. and initial column holding time of 5 min; column ramp rate of 5° C./min; final column temperature of 315° C. with a final column holding time of 20 min for a total run time of 80 min; both injector and detector temperatures were 250° C., the column was operated at constant flow at 1.0 ml/min of hydrogen carrier gas and injector split of 100. A 1 microliter undiluted sample was injected using a Hamilton 10 microliter syringe. The products were baseline separated and identified. Trace amounts of C2, C3 and C4 appeared in the chromatogram while the majority of the products reside in the C5-C24 fraction. The small fraction of naphtha (C5-C9) that remained dissolved in the middle distillates in the cold trap was also quantified in this manner.

C) Gaseous Products Sampling

The carbon number distributions of the gaseous products were determined on a Varian CP-3900 GC equipped with a FID detector and a CP-Sil 5 CB capillary column with a poly-dimethyl-siloxane stationary phase. The same GC method used for analysis of the liquid products was applied, except that the final column temperature was 285° C. and the final column holding time was 3.5 min for a total run time of 57.5 min. The sample loop volume was 100 μl. Testifying to efficiency of the condenser and cold trap, only a small tail of C10-C24, and within this tail predominately C10 and C11, was found in the chromatograms. No evidence of condensation of middle distillates beyond the condenser/cold trap was found. Condensation in the sample loop would result in a growing or stable bump in the chromatogram easily identified by higher peak heights of longer hydrocarbons in the C12-C24 fractions.

Conversion, selectivity and yield in this work were calculated as follows. The wax conversion (percentage of the total, %) is defined as:

$$(W_{in}-W_{out}\cdot(1-D_{wax}))/W_{in}*100$$

$W_{in}$: weight of wax pumped into the reactor, $W_{out}$: weight of unconverted wax collected in the wax trap, $D_{wax}$: fraction of middle distillates (C10-C24) in $W_{out}$.

Yield is the mathematical product of conversion and selectivity. Middle distillates selectivity is calculated as follows:

$$(D_{wax}\cdot W_{out}+D_{cold}\cdot M_{cold}+D_{gas}\cdot M_{gas})/(W_{in}-W_{out}\cdot(1-D_{wax}))*100$$

$M_{cold}$: weight of liquids drained from the cold condensate trap. $D_{cold}$: fraction of middle distillates (C10-C24) in the cold condensate ($W_{cold}$), $M_{gas}$: weight of gaseous products not collected in either hot wax trap or the cold condensate trap, $D_{gas}$: fraction of middle distillates (C10-C24) in the gaseous products ($M_{gas}$).

$$M_{gas}=W_{in}-W_{out}-M_{cold}$$

The carbon number distributions of the gaseous products are calculated from the average of at least 10 gas samples taken during the 24 hours subsequent to reaching steady state.

The cetane number (CN) was calculated using the correlation derived by O'Connor et al. (C. T. O'Connor, R. D. Forrester, M. S. Scurrell, Fuel 1992, 71, 1323-1327).

$$CN=1.8+43.8\cdot(CH_2/CH_3)-8.1\cdot(CH_2/CH_3)^2+0.69\cdot(CH_2/CH_3)^3$$

All products were fully saturated and only mono-methyl-branched and trace amounts of di-methyl-branched paraffins were identified in the liquid condensate chromatogram. The cloud point is estimated by comparison with wax hydrocracking results from Leckel et al. (D. Leckel, Energy Fuels 2007, 21, 1425-1431) who used the appropriate ASTM to establish the cloud point of his middle distillate product.

Example 1: Middle Distillate Formation from Wax Hydrocracking Over Pt/MFI at 20 Bar, the Effect of Increased Gas Flow Rate and the Effect of Lower Space Velocity FIG. 1 shows the effect of hydrogen partial pressure on middle distillate formation from the hydrocracking of a wax feed over Pt/MFI, 2 wt. % Pt, at 20 bar, LHSV 1.0 h$^{-1}$ (1 g catalyst), at H$_2$/wax=10,000 vol./vol. (200 ml/min H$_2$), between 235° C.-265° C. and at H$_2$/wax=1,000 vol./vol. (20 ml/min H$_2$), between 245° C.-275° C. The result of lowering the space velocity from LHSV 1.0 h$^{-1}$ to 0.1 h$^{-1}$ at the high gas flow rate: H$_2$/wax=10,000 vol./vol. are also demonstrated in FIG. 1, the temperature is consequently lower: between 205° C.-223° C.

Typical industrial process conditions for wax hydrocracking over amorphous silica-alumina catalyst include pressure of 35 bar and higher, temperatures of at least 350° C., a liquid hourly space velocity of 1.0 h$^{-1}$ and a H$_2$/feedstock volumetric ratio of 1,000 m$^3$/m$^3$. As can been seen from FIG. 1, under such typical hydrocracking reaction conditions (i.e. a H$_2$/feedstock volumetric ratio of 1,000 vol./vol.), the Pt/MFI catalyst produces primarily naphtha and light gas, especially at elevated conversions. FIG. 1 also demonstrates the improvement to the middle distillate selectivity from an increased gas flow rate by elevating the H$_2$/wax ratio of volumetric feed from 1,000 to 10,000 (vol./vol.).

In the experiments of the present invention, a high gas flow rate over the liquid phase gives higher middle distillate yields. Without thereby wishing to be bound by theory, this it attributed to better mass transport, which avoids consecutive reactions that produce naphtha and light gas formation. It is not implausible that the high gas flow rate establishes a turbulent flow regime reminiscent of the industrial unit. At industrial scale, the higher mass flux may obviate the need for a high H$_2$/wax (vol./vol.) ratio.

At lower space velocity and keeping the high H$_2$/wax ratio of 10,000 (vol./vol.), the reaction temperature can be lowered. At LHSV: 0.1 h$^{-1}$, the reaction temperature needed for 20% to 80% conversion was between 205° C.-223° C. whereas the higher LHSV: 1.0 h$^{-1}$ required much higher temperatures, between 235° C.-265° C. At high temperatures the reaction rate can become diffusion controlled. The apparent rate is limited by the relatively slower supply of reagents. By lowering the reaction temperature, a kinetically controlled regime may be established since the reaction rate is more sensitive to temperature than diffusion—the activation energy of reaction is higher than that of diffusion. When diffusion is no longer rate limiting it also becomes possible to suppress secondary cracking reactions of the reaction intermediates. In the case of this example however, it appears that the potential benefit of operating at a lower temperature is offset by the long residence time in the catalyst pores at low space velocity (LHSV: 0.1 $h^{-1}$).

Example 2: Hydrocracking Over Pt/MFI at 20 Bar and Atmospheric Pressure (Dry and Wet)

Figure 2:
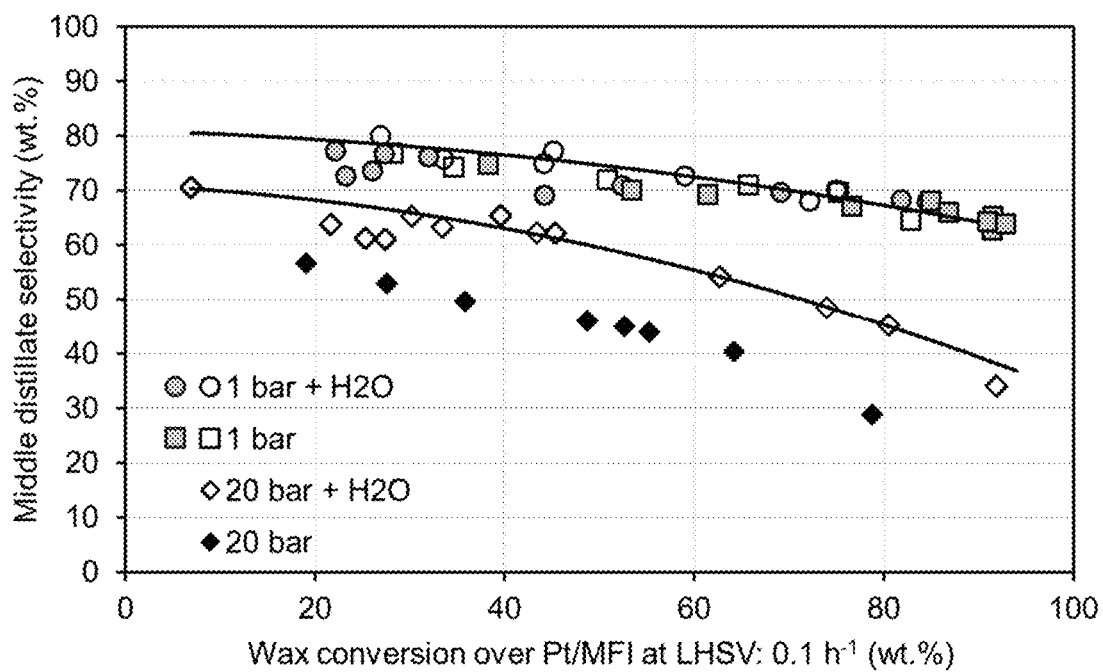
FIG. 2 shows the effect of water on wax hydrocracking over Pt/MFI at 20 bar and atmospheric pressure (1 bar, dry and wet), at LHSV: 0.1 h$^{-1}$ and high gas flow rate (H$_2$/wax: 10,000)

FIG. 2 shows results for the middle distillate formation from hydrocracking over Pt/MFI catalyst comprising 2 wt. % Pt. The experiments were performed at a liquid hourly space velocity (LHSV) of 0.1 $h^{-1}$, with 20 g catalyst, 200 ml/min $H_2$, 0.02 ml/min wax feed ($H_2$/wax=10,000 vol./vol.), and 0.02 ml/min $H_2O$ for the wet experiments. The temperature ranged from 205° C.-225° C. at 20 bar (dry) and 215° C.-240° C. at 20 bar (wet); and from 200° C.-215° C., at 1 bar (wet and dry).

As can be seen from FIG. 2, with the introduction of water to the hydrocracking experiment at 20 bar, the middle distillate selectivity was markedly increased at all conversion levels. Without thereby wishing to be bound by theory, it is believed that this may be explained by the competitive adsorption of water. Nevertheless, the selectivity remains too low to be considered for industrial scale hydrocracking.

By lowering the pressure from 20 bar to atmospheric pressure (1 bar, 0 bar gauge) a much higher middle distillate selectivity could be obtained, in the presence or absence of water, as can further be seen from FIG. 2. Significantly at high conversions, the middle distillate selectivity remains high, approximately 64% at 95 conversions, giving a yield in excess of 60% in a single pass of the wax feed. A full-scale industrial hydrocracking process operates with a recycle and a fractionator at a typical per pass conversion of 60% so it is important that the selectivity is sufficiently high at that conversion level. It can also be seen that the activity is not suppressed by the presence of water. The selectivity is not improved by water suggesting that the action of competitive adsorption is impeded by the lower pressure.

The middle distillate fraction from hydrocracking over Pt/MFI at atmospheric pressure is composed of 60% branched alkanes and 40% linear alkanes. Within the branched alkanes, the mono-methyl branched alkanes predominate. The middle distillates fraction from dry atmospheric hydrocracking has a calculated cetane number of 81 and an estimated pour point of 0° C. This can be considered premium fuel.

Co-processing of an FT-feedstock composed of long chain paraffin together with the primary FT-product: water is equally feasible at atmospheric pressure. In the presence of water, the middle distillates fraction contains slightly more linear components and therefore has a higher cetane number but also a higher pour point.

At high conversion, gasoline (C5-C9) is also formed, but to the inventor's surprise and satisfaction the light gas formation (C1-C4) remains very low. For example, at 86.5% conversion, the LPG yield was only 6.8% (by weight). The total yield of valuable, liquid fuels (middle distillates+ gasoline) is about 93.2% at 86.5 conversion.

Figure 3:
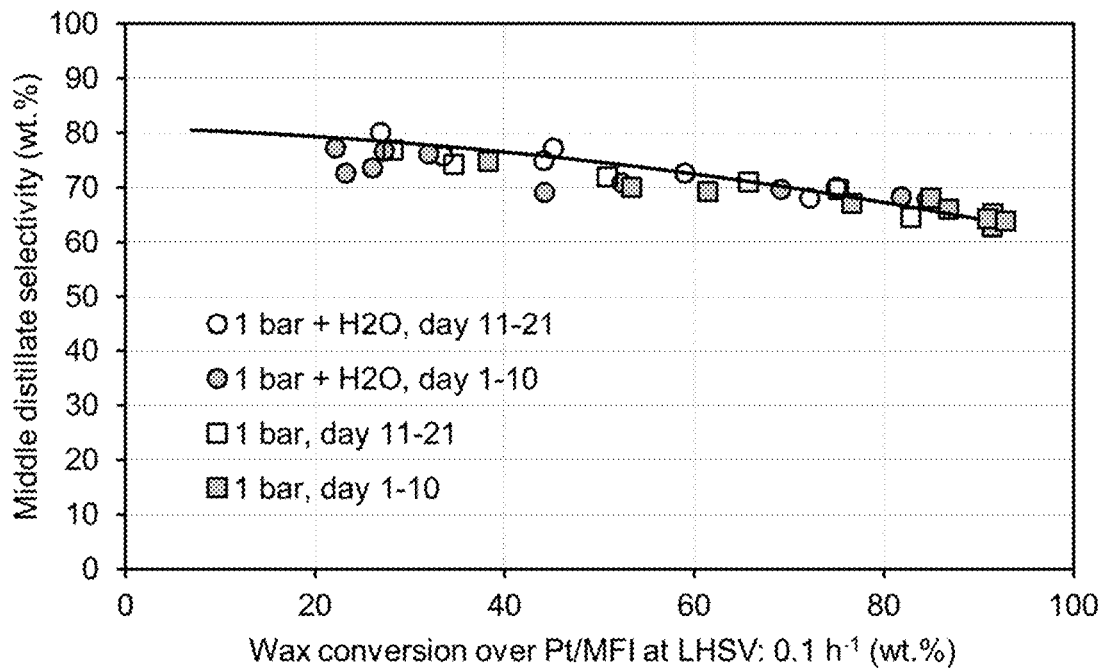
FIG. 3 shows the results of hydrocracking over Pt/MFI at atmospheric pressure (dry and wet) with increasing (run day 1-10) and decreasing (run day 11-21) temperature over time, at LHSV: 0.1 h$^{-1}$ and high gas flow rate (H$_2$/wax: 10,000)

Example 3: Hydrocracking Over Pt/MFI at Atmospheric Pressure (Dry and Wet) with Increasing and Decreasing Temperature Over Time FIG. 3 shows the results for middle distillate formation from hydrocracking over Pt/MFI, 2 wt. % Pt, at LHSV 0.1 $h^{-1}$, with 20 g catalyst, 200 ml/min $H_2$, 0.02 ml/min wax feed ($H_2$/wax=10,000 vol./vol.), and 0.02 ml/min $H_2O$ (wet). The temperature was incrementally increased from 200° C. to 215° C. from day 1 to day 10, at 1 bar (wet and dry), and subsequently incrementally decreased from 215° C. to 200° C. from day 11 to day 21.

As can be seen from FIG. 3, it is apparent that no catalyst deactivation occurred. Rather, in the presence of water the catalyst seems to improve with time, reaching a higher selectivity after 20 days than when steady state was first obtained at 200° C.

Example 4: Effect of Space Velocity on Middle Distillate Formation from Wax Hydrocracking Over Pt/MFI at Atmospheric Pressure FIG. 4 shows the effect of space velocity on middle distillate formation from wax hydrocracking over Pt/MFI, 2 wt. % Pt, at LHSV 0.1 $h^{-1}$ with 20 g catalyst extrudates between 200° C.-215° C., and at LHSV 1.0 $h^{-1}$ with 1 g catalyst extrudates between 230° C.-260° C., 200 ml/min $H_2$, 0.02 ml/min wax ($H_2$/wax=10,000 vol./vol.).

Figure 4:
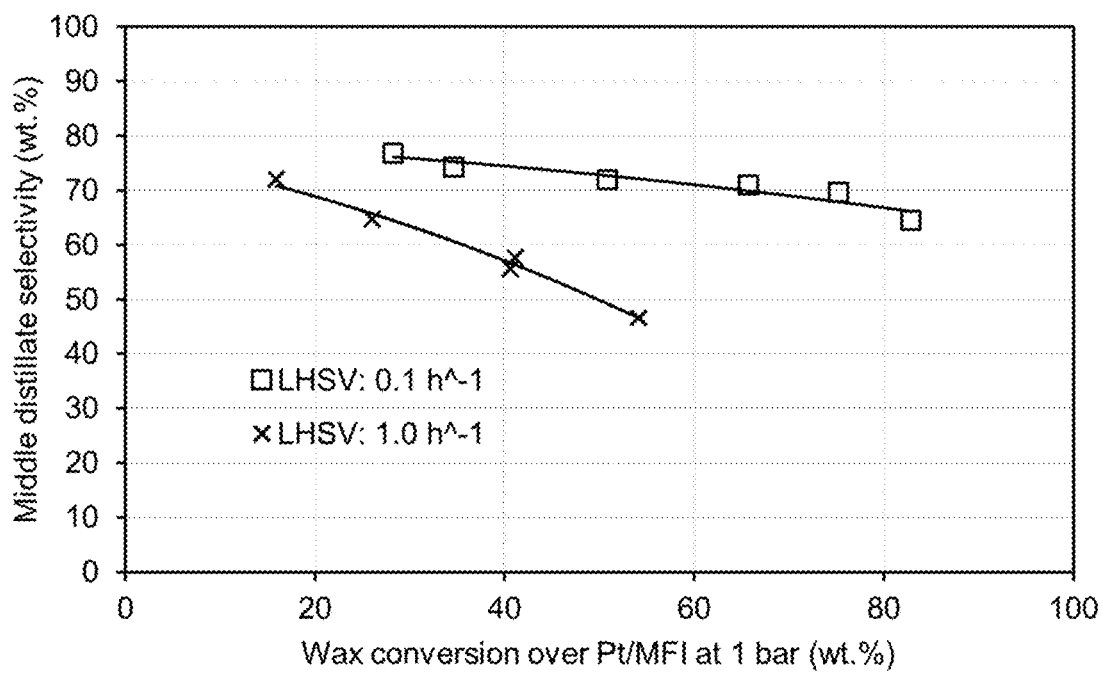
FIG. 4 shows the effect of space velocity on middle distillate formation from wax hydrocracking over Pt/MFI at atmospheric pressure (dry) and high gas flow rate (H$_2$/wax: 10,000)

As can be seen from the results shown in FIG. 4, while the wax hydrocracking process benefits greatly from lowering the pressure to atmospheric pressure (FIG. 4) and high middle distillate selectivities are observed at reasonable conversions, a further improvement can be achieved by lowering the liquid hourly space velocity from the typically practiced 1.0 $h^{-1}$ to 0.1 $h^{-1}$.

Figure 5:
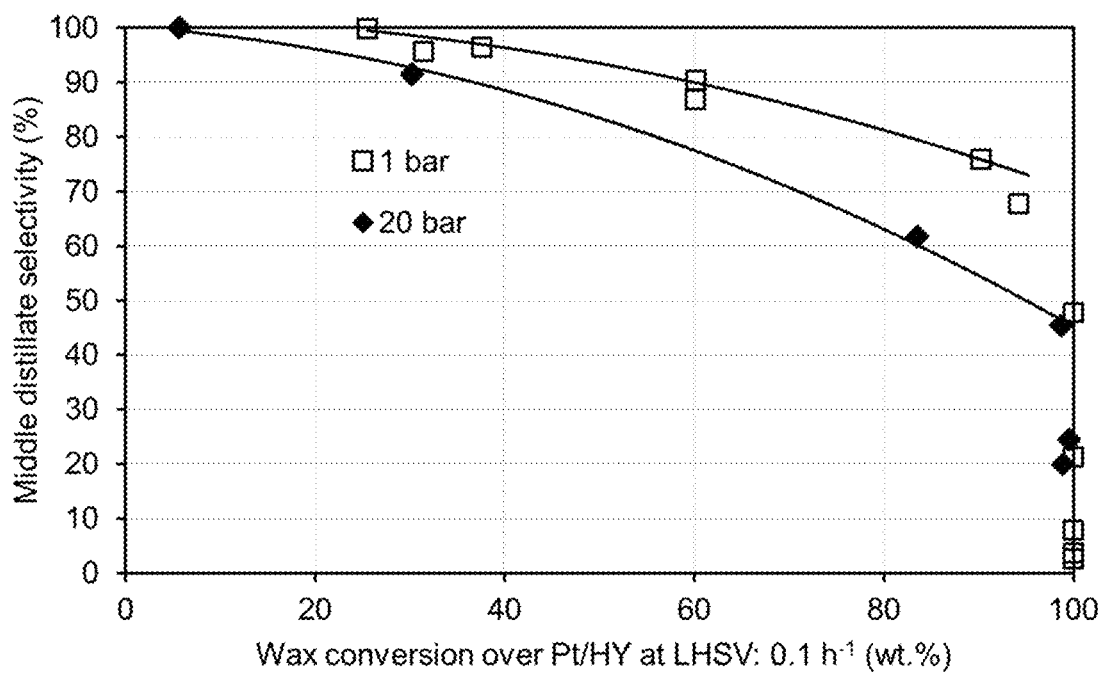
FIG. 5 shows the results of hydrocracking over Pt/HY at atmospheric pressure and at 20 bar, at LHSV: 0.1 h$^{-1}$ and high gas flow rate (H$_2$/wax: 10,000)

Example 5: Hydrocracking Over Pt/HY at Atmospheric Pressure, at Low Space Velocity, and by Comparison to Hydrocracking at 20 Bar FIG. 5 shows a comparison of wax hydrocracking at atmospheric pressure and at 20 bar over Pt/HY, 1 wt. % Pt, at LHSV 0.1 $h^{-1}$ (10 g catalyst), with $H_2$/wax=10,000 vol./vol. (200 ml/min $H_2$), between 171° C.-225° C. At atmospheric pressure, a single pass (once through) middle distillate yield of 69% is achieved, corresponding to 76% selectivity at 90% conversion. This is a marked increase from the results obtained with Pt/MFI under the same reaction conditions, as displayed in FIG. 2.

Furthermore, the selectivity approaches 100% at low conversions. At an acceptable conversion of 40 should one wish to operate this process not as a single pass but as the ubiquitous recycle process, the middle distillate yield reaches an unprecedented 96.5%. The light gas and naphtha formation combined does not surpass 4%.

The product from wax hydrocracking in Pt/HY consist of more than 95% branched paraffin (iso-alkanes) and 5% linear paraffin (n-alkanes). This results in a very low estimated cloud point at less than −45° C. This is low enough for the most stringent premium winter/arctic diesel fuel and Jet A1 aviation fuel specifications. The cetane number of the diesel fraction is in excess of 85, another hallmark of high quality fuel.

Figure 6:
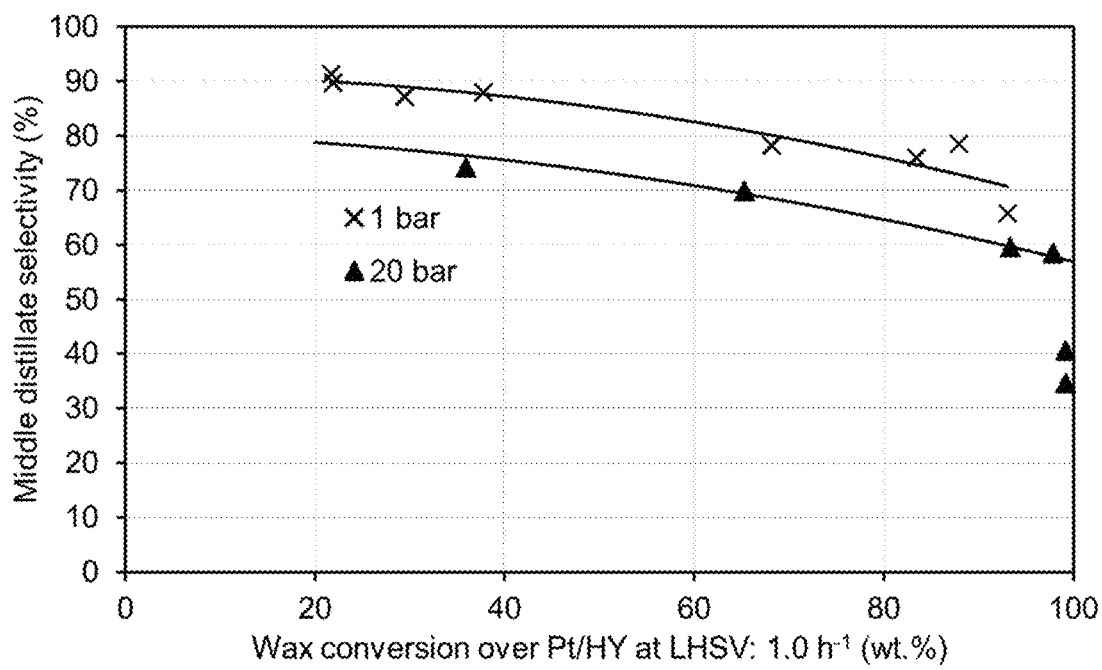
FIG. 6 shows the results of hydrocracking over Pt/HY at atmospheric pressure and at 20 bar over Pt/HY, at LHSV 1.0 h$^{-1}$ and high gas flow rate (H$_2$/wax: 10,000)

Example 6: Effect of High Space Velocity on Hydrocracking Over Pt/HY at Atmospheric Pressure, and by Comparison to Hydrocracking at 20 Bar FIG. 6 shows a comparison of wax hydrocracking at atmospheric pressure (215° C.-260° C.) and at 20 bar (225°

C.-265° C.) over Pt/HY, 1 wt. % Pt, at LHSV 1.0 h$^{-1}$ (1 g catalyst), with H$_2$/wax=10,000 vol./vol. (200 ml/min H$_2$). Whereas an increase in the space velocity from 0.1 h$^{-1}$ to 1.0 h$^{-1}$ resulted in a dramatic reduction of the middle distillate yield over Pt/MFI, as displayed in FIG. 4, here, with Pt/HY, it is demonstrated that both at low as well as at high space velocities high middle distillate yields can be obtained. Remarkably, at higher conversions, the middle distillate yield is unaffected by the high space velocity and remains at around 70%. At lower conversions the middle distillate selectivity reaches 90% at high LHSV versus 100 at low LHSV.

Figure 7:
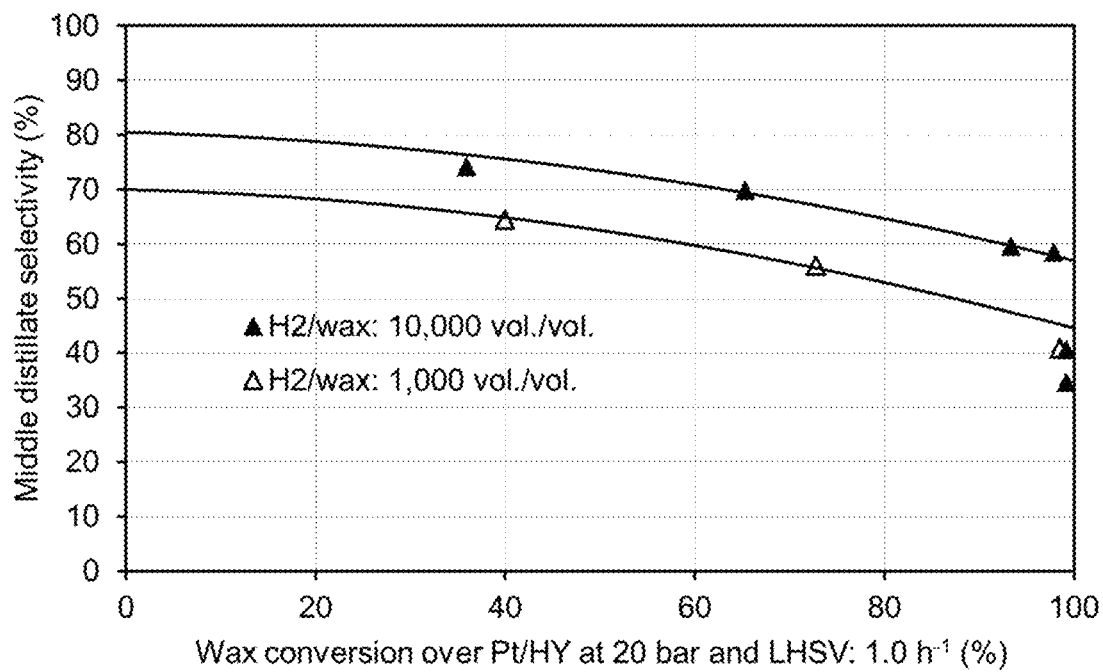
FIG. 7 shows the effect of hydrogen gas flow rate (H$_2$/wax: 1,000-10,000) on middle distillate formation from wax hydrocracking over Pt/HY, at 20 bar and at LHSV 1.0 h$^{-1}$.

Example 7: Effect of Lower Hydrogen Gas Flow Rate on Middle Distillate Formation from Wax Hydrocracking Over Pt/HY FIG. 7 shows the effect of gas flow rate on middle distillate formation from wax hydrocracking over Pt/HY, 1 wt. % Pt, at 20 bar, LHSV 1.0 h$^{-1}$ (1 g catalyst), with H$_2$/wax=10,000 vol./vol. (200 ml/min H$_2$) between 225° C.-245° C., or with H$_2$/wax=1,000 vol./vol. (20 ml/min H$_2$) between 235° C.-255° C.

As can be seen from FIG. 7, in comparison with FIG. 1 showing a Pt/MFI catalyst under the same reaction conditions, large pore zeolite catalysts, such as Pt/HY, are to a lesser extent hindered by diffusional limitations. This is reflected in the better performance and higher middle distillate selectivities under typical industrial hydrocracking process conditions (LHSV: 1.0 h$^{-1}$, 20 bar, H$_2$/wax: 1,000 vol./vol.). The Pt/MFI produces no more than 15% yield of middle distillates by weight, whereas the Pt/HY produces 40% yield at these conditions in once-through mode. Nevertheless, FIG. 7 demonstrates that an elevated gas flow rate can increase the middle distillate yield from 40% to approximately 55%. At industrial scale, the higher mass flux may obviate the need for a high H$_2$/wax (vol./vol.) ratio.

Example 8: Effect of Total Pressure on n-Hexadecane Hydrocracking of Pt/MFI

Figure 8:
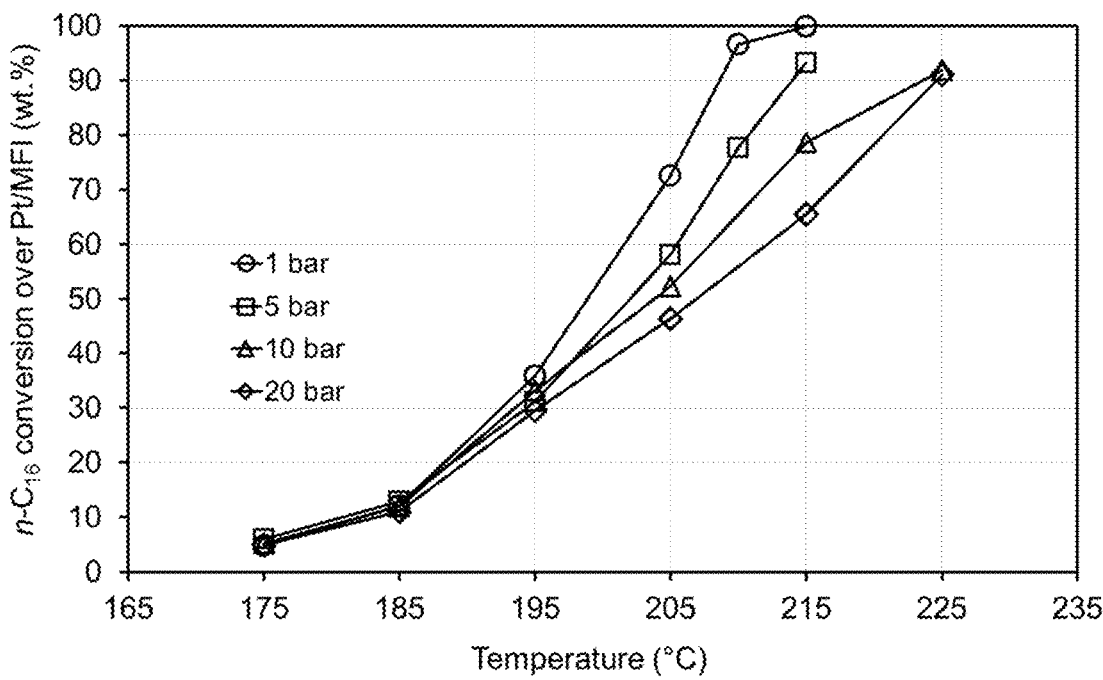
FIG. 8 shows the effect of total pressure on n-hexadecane hydrocracking over Pt/MFI.

FIG. 8 elegantly shows the effect of total pressure on n-hexadecane hydrocracking over Pt/MFI 1 wt. % Pt. H$_2$/n-C16: 1,000 vol./vol., LHSV: 1.0 h$^{-1}$, at varying temperature, at 20 bar, 10 bar, 5 bar and at atmospheric pressure (1 bar). At atmospheric pressure the reaction rate is dramatically increased. An even greater increase of the reaction rate of n-hexadecane was observed over Pt/HY from 20 to 1 bar. Higher reaction rates allow for lower process temperatures, and at lower process temperatures there is a higher likelihood that paraffin diffuses faster than that it undergoes consecutive reactions.

This above description of some of the illustrative embodiments of the invention is to indicate how the invention can be made and carried out. Those of ordinary skill in the art will know that various details may be modified thereby arriving at further embodiments, but that many of these embodiments will remain within the scope of the invention as defined by the claims which follow.

The invention claimed is:

1. A process for the production of a middle distillate from a paraffinic hydrocarbon feedstock, the method comprising feeding the hydrocarbon feedstock into a hydrocracking reactor and over a metal loaded large pore zeolite catalyst having a SiO$_2$/Al$_2$O$_3$ ratio of from about 2 to about 200 contained in the reactor wherein the metal is a noble metal selected from the group consisting of platinum, palladium, ruthenium, rhodium, osmium, and iridium, wherein a significant fraction of the feedstock is C25+ hydrocarbons, characterized in that the process is performed at a temperature of about 260° C. or less, and a pressure of about atmospheric pressure.

2. The process according to claim 1, wherein the process is performed at a temperature of about 160° C. to about 260° C.

3. The process according to claim 1, wherein the liquid hourly space velocity of the process is between about 0.05 h$^{-1}$ to about 5.0 h$^{-1}$.

4. The process according to claim 3, wherein the liquid hourly space velocity of the process is between about 0.1 h$^{-1}$ to about 1.0 h$^{-1}$.

5. The process according to claim 1, wherein the H2/hydrocarbon volumetric feed ratio is between about 1,000 vol./vol. to about 10,000 vol./vol.

6. The process according to claim 1, wherein the zeolite is a large pore zeolite having a FAU or *BEA framework topology.

7. The process according to claim 1, wherein the noble metal is platinum or palladium.

8. The process according to claim 1, wherein a significant fraction of the feedstock is C25-C100 hydrocarbons.

9. The process according to claim 1, wherein the process provides a middle distillate yield of greater than about 60% at atmospheric pressure, wherein the middle distillate is a C10-C24 fraction.

10. The process according to claim 1, wherein the hydrocarbon feedstock comprises a water component.

11. The process according to claim 1, wherein the hydrocarbon feedstock is a product of the Fischer-Tropsch process.

12. The process according to claim 1, wherein substantially no catalyst deactivation occurs at least within the 21 days of use.

* * * * *